March 15, 1966 A. KUHN ETAL 3,240,001
DEVICE FOR THE SEPARATION OF MOISTURE DROPS FROM A GAS-STREAM
Filed March 29, 1962
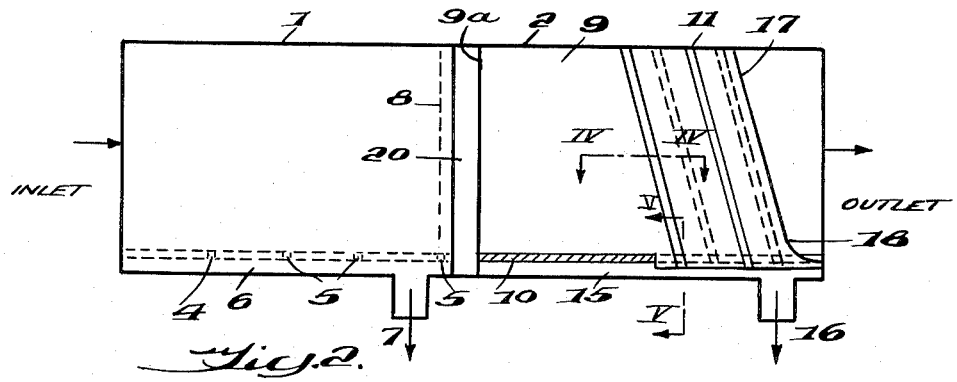
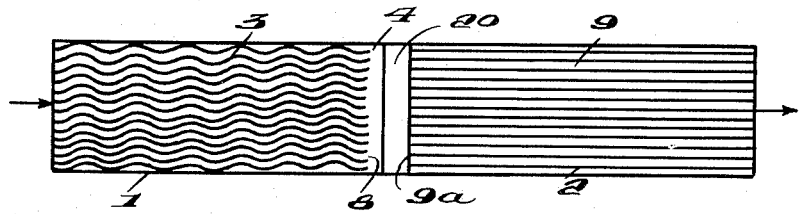
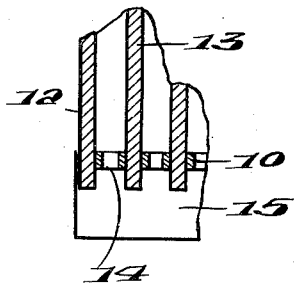
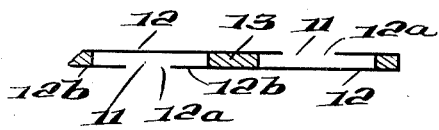
INVENTORS
Alfred Kuhn
Wilhelm Vollmann
BY Pierce, Scheffler & Parker
ATTORNEYS

# United States Patent Office 3,240,001
Patented Mar. 15, 1966

3,240,001
DEVICE FOR THE SEPARATION OF MOISTURE DROPS FROM A GAS-STREAM
Alfred Kuhn, Zurich, and Wilhelm Vollmann, Nussbaumen, Switzerland, assignors to Aktiengesellschaft Brown, Boveri & Cie, Baden, Switzerland, a joint-stock company
Filed Mar. 29, 1962, Ser. No. 183,592
Claims priority, application Switzerland, May 18, 1961, 5,801/61
4 Claims. (Cl. 55—392)

The present invention relates to a device for the separation of moisture drops out of a gas-stream by means of an assembly of parallel spaced plates between which the gas-stream flows.

For the separation of liquid drops from a gas-stream in which they are suspended, there are several known methods. With larger-size drops it is sufficient to provide a settling section through which the gas-stream flows at only a low speed, in order for the drops to precipitate due to their own weight. The same purpose is served by deflection plates with sharp changes in the flow direction. With the first-mentioned system it is necessary to have broad flow chambers with corresponding space requirements; with the latter-mentioned the strong flow-resistance gives rise to a high pressure loss.

For the drying of gas-streams in which liquid drops are suspended, diverse centrifugal separators are employed which utilize the density differential of the gas and the liquid for the separation of the latter. These types of equipment cause likewise a large pressure loss in the flow, especially when fine drops too must be extracted. Another method, with only small pressure loss, is available in which a separative action is caused by turbulence between plates parallel to each other in the flow direction; with this system, however, in the case, for example, of wet-steam turbines, the desired degree of separation is not attained. An improvement can be obtained with parallel plates which are bowed out laterally at one point; with this too, however, the separation is still not adequate.

These disadvantages are avoided with the arrangement according to the invention, in which an assembly of flat plates is inserted after and spaced from an assembly of corrugated plates, as viewed in the flow direction, the plates of both assemblies being positioned vertically and arranged at least approximately parallel to the general flow direction and the distance between corresponding points on adjacent corrugated plates being approximately equal to twice the height of the corrugation.

One suitable embodiment of the invention is represented in the drawing. FIG. 1 shows the arrangement in side view with part of the side plate of the casing removed; FIG. 2 is a view in top plan of the corrugated and flat plate assemblies; FIG. 3 is a section taken from FIG. 2 to a larger scale; and FIGS. 4 and 5 represent detail views at the sections IV—IV, and V—V respectively in FIG. 1, both to a larger scale.

The basic construction of the gas-liquid separator arrangement is evident from FIGS. 1 and 2. It consists of two elongated casing parts 1, 2, connected in generally end-to-end relation by an intermediate casing part 20 through which the gas-stream flows one after another. The gas-stream first enters the assembly of corrugated plates 3 which extend over the total height of the flow space in casing 1 and are usually constructed of thin sheet-metal plates. In view of their relative thinness, the plates 3 have been depicted by single lines only in FIG. 2. They stand vertically on a base-plate 4 and are arranged parallel to the general direction of flow, leaving narrow access channels free for the gas flow.

The corrugated character of plates 3 can be adapted to the occurring conditions. Suitable for this are a sinusoidal section as shown or, moreover, a combination of circular shapes and straight pieces, or also a zig-zag line, whose corners are suitably rounded off. At the same time it is important that there be obtained a good change in flow direction without the flow losses being allowed to rise too much. It has been shown to be advantageous to choose the separation distance $a$, FIG. 3, between corresponding points on adjacent plates 3 approximately equal to twice the wave-height $b$.

Due to the turbulence of the flow and the repeated changes in flow direction between the corrugated plates 3, the drops of liquid are separated out of the gas-stream. A smaller portion of them arrives at the base plate 4, FIG. 1, and pass through openings 5 in the latter into the collecting chamber 6, out of which the liquid is drained off at 7. The larger part of the separated moisture is dispatched as a liquid-film along the plates 3 and gathers at the exit edge 8 of the latter, flowing therefrom to the base-plate 4 or being drawn away with the gas-stream.

After leaving the exit edges 8 of the corrugated plates 3, the gas-stream passes through the comparatively shorter intermediate casing part 20 which has no plates and into the casing part 2 where it enters at the entrance edges $9a$ of the second assembly of flat plates 9 which occupy likewise the total height of the flow space in casing 2 and which are arranged vertically on the base-plate 10 and parallel to the general flow direction. In the most elementary design they are constructed of thin sheet-metal plates, the separation between adjacent plates however, not being necessarily the same as that for the corrugated plates.

The function of the plates 9 is to receive the drops of moisture which are drawn from the rear-edge 8 out of casing part 1 and to drain them away. The collecting action becomes greater if the gas-flow is not parallel to the plates but takes effect at an angle to them. The greatest angle, and thus the strongest effect, results when the plates 3 have their ends at a turning-point in their wave-form; it must, however, be borne in mind for the sizing of the angle that the consequent sudden diversion of flow in the direction of the plates 9 involves a certain pressure loss.

The moisture-drops received, augumented by further drops which have been extracted too between the flat plates by turbulence, are gathered in part on the base-plate 10, the remaining quantity being dispatched as a fluid film along the plates 9. This film is taken up in the separator pockets 11 of which at least one is available on each side of the plate, and led away to the bottom. The pockets lie either vertically or inclined to the flow direction. They can be worked out of solid plate material which correspondingly requires thick plates and higher production cost, or each plate 9 can be produced each from two parallel flat side plates 12, FIG. 4, which are held in parallel, spaced-apart relation by means of spacer members 13, the space between the side plates 12 establishing the pockets 11, and entrance to the pockets being established by interrupting gaps $12a$ in plates 12. In order to increase their reception-capacity and to conduct better the collected moisture therein, it has been shown to be useful to cover the pockets 11 over partly in their lateral directions, such an arrangement being illustrated in FIG. 4 wherein it will be seen that the portions $12b$ of plates 12 extend beyond the ends of the pocket to form the gaps $12a$.

The moisture collected on the base-plate 10 flows through openings 14, FIG. 5, into the collecting chamber 15 situated below, out of which it is drawn off at outlet 16. It facilitates the moisture drainage if the flat plates 9 or at least, those parts of the plates at which the separating pockets 11 come to an end, protrude through the base-plate 10 into the collecting chamber 15, as shown in FIG. 5.

The cross-section of the pockets 11 is suited to the occurring conditions. They must be large enough to accept the collected moisture but nonetheless not too large as otherwise the flow is unnecessarily disturbed. As the quantity of the mosiure received in a single pocket depends, among other things, on its length, the height of the plates 9 is thus limited, the breadth of casing 2 being chosen to give a suitable ratio with the latter. Should the flow section thus resulting be inadequate for an occurring gas-quantity, there can, of course, be arranged two or more separator-devices beside or on top of one another.

The small quantity of moisture which may remain in the gas stream after it passes the pocket 11 in plates 9 as viewed in the flow direction, gathers at the trailing edge 17 and flows off into the collecting chamber 15. It is of advantage to have the trailing edge 17 inclined to the flow direction in order to facilitate the draining off of the liquid and thus to restrict the drops being drawn off by the gas-stream, which is just what one wishes to avoid in the rearmost part of a moisture-separator. This effect occurs firstly in the lower part of the trailing edge where naturally the collected liquid quantity is greatest. It is thus appropriate for this purpose if the inclination of the trailing edge 17 to the flow direction is substantially reduced in the lower part 18, to prevent this drawing-off of the drops.

If gas too is extracted from the collecting chamber 15 below the flat plates 9, then the liquid which has collected on the base-plate 10 in the pockets 11 is, to a certain extent, sucked away, by means of which the separative-effect of the apparatus is yet more improved. The extracted gas is fed again into the gas-stream or in some other way utilized.

The described apparatus can be employed for the drying of any gas containing moisture-drops. As an example may be quoted wet steam turbine plants, in which —especially in connection with the utilization of heat-energy released by nuclear fission—a steam-water mixture of high water content results due to the expansion. This operates unfavorably on a turbine due to the deterioration of its efficiency caused by the braking effect of the water, and due to the blade-destruction caused by erosion, ocurring from the blows of the incident drops. With such installations it is thus necessary to build in a water-separator before the lower stages, most suitably in the by-pass between two turbine-casings. The described apparatus is best suited for it. If, at the same time, steam should be drawn off too with the water then this can be employed as bleed-steam for feed-water pre-heating.

The good working action of the apparatus arranged as according to the invention depends on the fact that it does not fulfill its two appointed tasks at the same time and thus incompletely, but in two separate stages. The corrugated plates have the function especially of separating the liquid from the gas-stream while the flat plates serve predominantly for the extraction of the liquid.

We claim:

1. Apparatus for separating out liquid droplets entrained in a gas-stream comprising first and second elongated casings arranged in end-to-end relation through which the gas stream flows in succession, a first elongated assembly of spaced plates located in said first casing and which are corrugated throughout their entire length, a second elongated assembly of spaced plates located in said second casing and which are planar throughout their entire length, the corrugated and planar plates of said first and second plate assemblies respectively being positioned vertically within said casings from the bottom to the top walls thereof and arranged substantially parallel to the general flow of the gas stream passing through said casings, the entrance edges to the planar plates of said second plate assembly being spaced from the exit edges of the corrugated plates of said first plate assembly by a distance which is small in comparison with the length of said plate assemblies, the distance between corresponding points on adjacent corrugated plates of said first plate assembly being approximately equal to twice the height of the corrugation and the exit edges of the corrugated plates of said first plate assembly terminating at such a turning point in their wave form as to cause said gas-stream and the droplets separated therefrom to enter the planar plates of said second plate assembly at an angle to and thereby impinge obliquely upon said planar plates, said first plate assembly having a primary function of separating the liquid droplets from said gas-stream and said second plate assembly having a primary function of removing the liquid which has been separated out of said gas stream in said first plate assembly and means provided at the bottom part of at least said second casing upstream of the outlet end thereof for draining away such liquid as is separated in said casing from said air stream.

2. Apparatus as defined in claim 1 for separation of liquid droplets entrained in a gas-stream wherein each of the planar plates of said second plate assembly include at least one separator pocket located on each side thereof upstream from the exit edges of the plates, said separator pockets being partially covered over in their lateral direction and also being inclined downwardly in the direction of flow of said gas-stream.

3. Apparatus as defined in claim 1 for separation of liquid droplets entrained in a gas-stream wherein the planar plates of said second plate assembly include trailing edges which are inclined downwardly in the direction of flow of said gas stream, the inclination of said trailing edge being reduced at the bottom portion thereof.

4. Apparatus as defined in claim 1 for separation of liquid droplets entrained in a gas-stream wherein each of the planar plates of said second plate assembly is constituted by two planar side plates held in parallel spaced-apart relation by spacer members, said planar side plates including a gap therein between adjacent spaced members establishing an entrance for flow of the collected liquid into a drainage pocket formed between the side plates.

References Cited by the Examiner

UNITED STATES PATENTS

| | | | |
|---|---|---|---|
| 2,838,132 | 6/1958 | Markham et al. | 55—444 |
| 2,921,647 | 1/1960 | Pietrasz | 55—444 |
| 2,967,586 | 1/1961 | Jaklitsch | 55—278 |

FOREIGN PATENTS 547,981  4/1932  Germany.

HARRY B. THORNTON, *Primary Examiner.*